United States Patent [19]

Snow

[11] Patent Number: 5,104,576
[45] Date of Patent: Apr. 14, 1992

[54] ALKANOLAMINO FUNCTIONAL SILOXANE COMPOSITION

[75] Inventor: Steven A. Snow, Midland, Mich.

[73] Assignee: Dow Corning Corporation, Midland, Mich.

[21] Appl. No.: 559,116

[22] Filed: Jul. 26, 1990

Related U.S. Application Data

[62] Division of Ser. No. 390,019, Aug. 7, 1989.

[51] Int. Cl.$^5$ ...................... B01F 17/00; B01D 17/16
[52] U.S. Cl. ..................................... 252/357; 252/358
[58] Field of Search ................ 252/357, 358; 556/413, 556/419, 405, 422, 402, 425

[56] References Cited

U.S. PATENT DOCUMENTS 4,342,742  8/1982  Sebag et al. .................... 556/413 X Primary Examiner—Paul F. Shaver
Attorney, Agent, or Firm—Robert L. McKellar; Sharon K. Severance

[57] ABSTRACT

This application relates to novel compositions of matter generally classified as alkanolamino functional siloxanes. These compositions have a structure selected from the group consisting of:

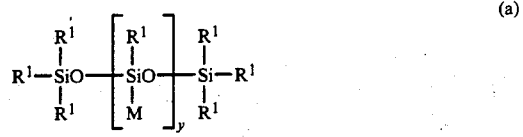

(a)

and

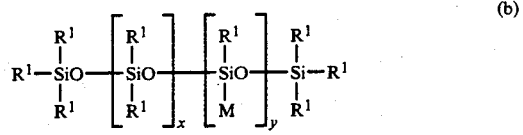

(b)

wherein x represents an integer of from 1 to 100; y represents an integer of from 1 to 10; $R^1$ represents a lower alkyl group; and M is an alkanolamino group selected from the group consisting of:

$$-(CH_2)_aN(R^2)-(CH_2)_bOR^3; \text{ and} \quad (c)$$

$$-(CH_2)_aN^+(R^2)(R^4)-(CH_2)_bOR^3Z^-. \quad (d)$$

Compositions of this invention exhibit utility in altering the surface activity of water.

3 Claims, No Drawings

ALKANOLAMINO FUNCTIONAL SILOXANE COMPOSITION

This is a divisional of copending application Ser. No. 07/390,019 filed on Aug. 7, 1989.

BACKGROUND OF THE INVENTION

This application relates to novel compositions of matter, particularly to alkanolamino functional siloxanes. These new compositions of matter have utility in altering the surface tension of water.

The compositions of the invention have a structure selected from the group of general formulas consisting of:

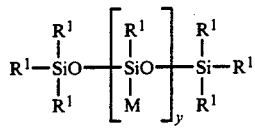
(a)

and

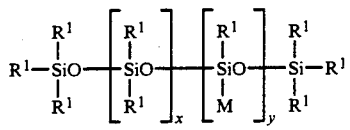
(b)

wherein x represents an integer of from 1 to 100; y represents an integer of from 1 to 10; $R^1$ represents a lower alkyl group; and M is an alkanolamino group. More specifically, M represents a substituent selected from the group consisting of:

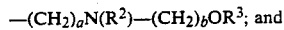  (c)

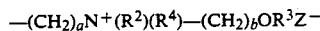  (d)

U.S. Pat. No. 3,389,160 to Reid discloses alkylamino organosilicon compounds useful as corrosion inhibitors for aqueous systems. The organosilicon material in Reid has an alkylamino substituent with the structure:

This structure differs from that of substituent M in the present invention particularly in regard to the presence of an alcohol group on the alkyl chain of the Reid material and the also absence of an ether linkage as found in the present invention.

SUMMARY OF THE INVENTION

The invention comprises a novel composition of matter classified as an alkanolamino functional siloxane, wherein the composition has a basic chemical structure selected from the group consisting of:

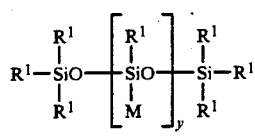
(a)

and

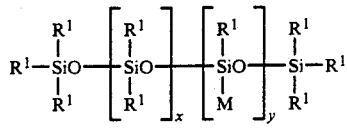
(b)

wherein:
x represents an integer of from 1 to 100;
y represents an integer of from 1 to 10;
$R^1$ represents a $C_1$ to $C_6$ alkyl group, for example: methyl, ethyl, propyl, butyl, pentyl and hexyl, however, methyl is preferred; and M is an alkanolamino group, preferably a member selected from the group consisting of:

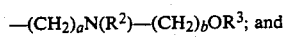  (c)

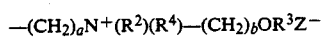  (d)

wherein
a represents an integer of from 1 to 10, preferably 3 to 4, and most preferably 3;
b represents an integer of from 1 to 10, most preferably 2;
$R^2$ is a member of the group consisting of hydrogen, a $C_1$ to $C_{18}$ alkyl group, for example: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl; a $C_6$ to $C_{18}$ aryl group, for example: cycloaromatic radicals having 6, 7, 8, 9, 10, 11, 12, 13, 14, 15, 16, 17, and 18 carbons in the ring thereof; an arene radical, derived for example from toluene, ethyl benzene, propylbenzene and butyl benzene, with

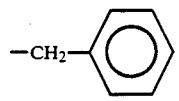

being preferred; and a $C_5$ to $C_{18}$ cycloalkyl group, for example: cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl and cyclooctadecyl;

$R^3$ is a member of the group consisting of hydrogen, a $C_1$ to $C_{18}$ alkyl group, for example: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl; a $C_6$ to $C_{18}$ aryl group, for example: cycloaromatic radicals having 6, 7, 8, 9, 10, 11, 12, 13, 14, 15, 16, 17, and 18 carbons in the ring thereof; a $C_5$ to $C_{18}$ cycloalkyl group, for example: cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl and cyclooctodecyl;
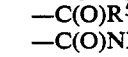,
,
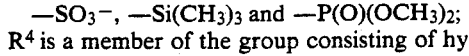;

$R^4$ is a member of the group consisting of hydrogen, a $C_1$ to $C_{18}$ alkyl group, for example: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl; a $C_6$ to $C_{18}$ aryl group, for example: cycloaromatic radicals having 6, 7, 8, 9, 10, 11, 12, 13, 14, 15, 16, 17, and 18 carbons in the ring thereof; an arene radical, derived for example from toluene, ethyl benzene, propylbenzene and butyl benzene, with

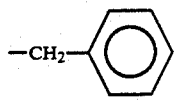

being preferred; and a $C_6$ to $C_{18}$ cycloalkyl group, for example: cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl and cyclooctodecyl;

$R^5$ is a member of the group consisting of a $C_1$ to $C_{18}$ alkyl group, for example: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl; a $C_6$ to $C_{18}$ aryl group, for example: cycloaromatic radicals having 6, 7, 8, 9, 10, 11, 12, 13, 14, 15, 16, 17, and 18 carbons in the ring thereof; and a $C_5$ to $C_{18}$ cycloalkyl group, for example: cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl and cyclooctodecyl;

$R^6$ is a member of the group consisting of a $C_1$ to $C_{18}$ alkyl group, for example: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl; a $C_6$ to $C_{18}$ aryl group, for example: cycloaromatic radicals having 6, 7, 8, 9, 10, 11, 12, 13, 14, 15, 16, 17, and 18 carbons in the ring thereof; and a $C_5$ to $C_{18}$ cycloalkyl group, for example: cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl and cyclooctodecyl; and Z is a member selected from the group consisting of Cl, Br, I, $NO_3$, a $C_1$ to $C_{18}$ alkylsulfate group, a $C_1$ to $C_{18}$ aryl sulfate group, wherein the aryl of the group is exemplified by cycloaromatic radicals having 6, 7, 8, 9, 10, 11, 12, 13, 14, 15, 16, 17, and 18 carbons in the ring thereof;
—$CH_3COO^-$, $BF_4^-$ and $PF_6^-$.

In other embodiments of the invention, it is preferred that x represent an integer of from 1 to 20, preferably 1 to 10 and most preferably 1 to 5, and y represent an integer of from 1 to 3 and most preferably 1.

It will be appreciated that a very wide variety of alkanolamino functional siloxane compositions can be prepared which fall within the preceding description of the invention.

The compositions of the invention are prepared by reacting a material having a structure selected from the group of general formulas consisting of:

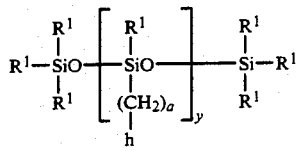

and

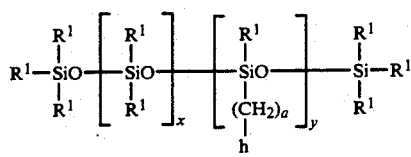

with a composition selected from the group consisting of:

$$HN(R^2)-(CH_2)_bOR^3; \text{ and} \qquad (g)$$

followed by reaction with reagents of the general formula $R^4Z$, wherein $R^4$ and Z are as described hereinabove, wherein h represents a halogen, preferably chlorine, with the remaining substituents in the formulas as previously described.

An example of the invention having the formulation $RN^+Me_2(CH_2)_2OC(O)MeNO_3^-$ was prepared by loading 1.5 g (3.5 mmoles) of $RN^+Me_2(CH_2)_2OH\text{-}NO_3^-$ (dried by prolonged exposure to high vacuum conditions at room temperature), 0.35 g (3.5 mmoles) of $Et_3N$ (dried over molecular sieves) and 5 ml of tetrahydrofuran (distilled over sodium benzophenone ketyl) into a 50 ml round-bottomed three-necked flask. The siloxane material and $Et_3N$ then dissolved into the tetrahydrofuran, producing a slightly yellowish solution and the mixture was cooled to 0° C. Wherein R in the formula above represents:

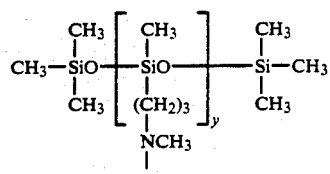

From a dropping funnel, 0.28 g (3.5 mmoles) of $CH_3C(O)Cl$, dissolved in 3 ml of THF, was added dropwise to the mixture in the round bottom flask. When approximately one third of the $CH_3C(O)Cl$ was added, the reaction mixture turned orange, then dark brown. It was noticed that concurrent with the color change, the temperature of the reaction mixture rose approximately 30 degrees in 3 to 5 minutes and a solid white material began to precipitate out of the reaction mixture. The addition was completed at a slow rate when the mixture returned to 0° C. and the contents of the flask were subjected to vigorous stirring.

Completion of the reaction occurred as the mixture was permitted to rise to room temperature while being stirred for about one hour. The white precipitate was removed by filtering and was then stripped of solvent on a rotary evaporator set at 60° C. and 2 torr. The stripped filtrate was then noted to have a brown, glutinous appearance.

A large volume of Et₂O solvent was added to the filtrate, which caused the separation of a white crystalline solid only partially soluble in water and tetrahydrofuran. The solid was determined to be RN⁺Me₂(CH₂)₂OC(O)MeNO₃⁻.

The routes used to obtain the entire range of compositions of the invention involve common chemical syntheses. Several specific examples of the syntheses are presented in equations (I) through (VIII) below, wherein Me represents methyl, Et represents ethyl, THF represents tetrahydrofuran and R represents formula (i), as described above.

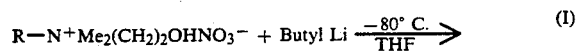

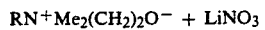

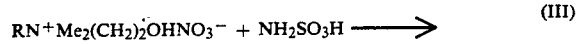

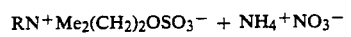

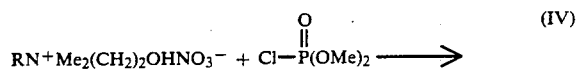

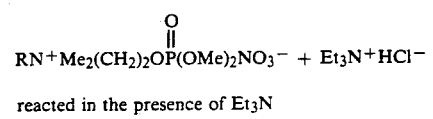

reacted in the presence of Et₃N

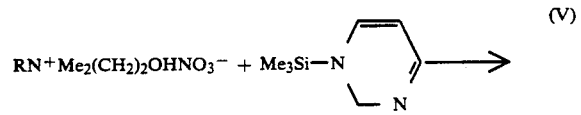

. heated in the presence of R₂N⁺Me(CH₂)₂OHCl⁻

*Other metal halides such as those selected from the group CuCl, NiCl₂ and FeCl₂ can be used.

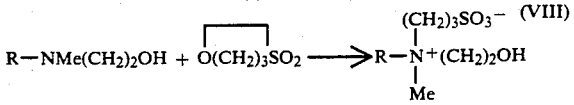

Experiments were conducted to determine the capability of the alkanolamino functional siloxanes of the invention to alter the surface tension of water. In particular, a comparison was made of the ability of water and water containing small quantities of alkanolamino functional silicones to wet polyethylene thereby determining the relative surface activity of the invention.

In this experiment, a sheet of polyethylene was prepared by cleaning with acetone and was placed on a substantially horizontal surface. A water standard was establishing by depositing a metered drop of distilled water on the prepared polyethylene sheet and determining the diameter of the droplet beaded-up on the surface of the polyethylene sheet. Drops of distilled water comparable in size to that of the water standard, but containing amounts of aminoalkanol functional siloxanes as indicated in TABLE I were likewise placed on the prepared polyethylene sheet. Once the drops containing the composition of the invention had stopped spreading, the diameter of the drops was measured. The relative wetting ability of the compositions is expressed as the ratio of the diameter of the drops containing alkanolamino functional siloxane to that of the diameter of the water standard alone. Results of this experiment are reported in TABLE 1 below.

TABLE 1

| TYPE OF ALKANOLAMINO FUNCTIONAL SILOXANE IN SAMPLE | RATIO OF WETTED AREA BY WEIGHT % OF SILOXANE IN SAMPLE TO WATER | | | |
|---|---|---|---|---|
| | 0.0 wt % | 0.05 wt % | 0.1 wt % | 1.0 wt % |
| None (water only) | 1.0 | — | — | — |
| RN⁺Me₂(CH₂)OHI⁻ | — | 1.1 | 1.3 | 2.3 |
| RN⁺Me₂(CH₂)₂OHNO₃⁻ | — | 1.1 | 1.1 | 4.6 |
|  | — | 1.1 | 1.1 | 1.4 |
| RN⁺Me₂(CH₂)₂OC(O)MeNO₃ | — | 1.4 | 1.3 | 3.4 |
| RN⁺Me({CH₂}₂OH)({CH₂}₃SO₃⁻) | — | 1.1 | 1.2 | 3.4 |

Surface activity of the compositions of the invention will be noted by the increased wetted surface area in tests of samples containing the siloxane materials of the invention as compared to water alone.

In separate measurements, the alkanolamino siloxane compounds reduced the surface tension of water from 72 to 21 dynes/cm.

The invention also relates to a method of reducing the surface tension of water by incorporating an amount of the composition of the invention in water. The amount by which the surface tension of water needs to be lowered will determine the amount of the composition of the invention which needs to be added to the water. In general terms, the composition is added in an amount effective to achieve the desired results. This can range in actual terms of from 0.001 wt. % to 5.0 wt. % surfactant based on the total amount of water and surfactant present in the system.

What is claimed is:

1. A method of reducing the surface tension of water by adding an effective amount of an alkanolamino functional siloxane composition having the general formula:

(a)
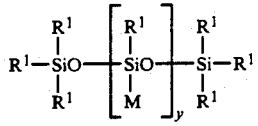

and (b)
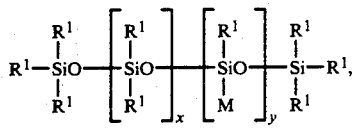

wherein
x is an integer of from 1 to 100;
y is an integer of from 1 to 10;
$R^1$ is a lower alkyl group; and
M is an alkanolamino group.

2. A method of reducing the surface tension of water as claimed in claim 1, wherein:
$R^1$ is further defined as comprising a $C_1$ to $C_6$ alkyl group; and
M is a member selected from the group consisting of:

$-(CH_2)_a N(R^2)-(CH_2)_b OR^3$; and $-(CH_2)_a N^+(R^2)(R^4)-(CH_2)_b OR^3 Z^-$ wherein a is an integer of from 1 to 10;
$R^2$ is a member of the group consisting of H, a $C_1$ to $C_{18}$ alkyl group, a $C_6$ to $C_{18}$ aryl group,

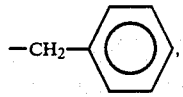

and a $C_5$ to $C_{18}$ cycloalkyl group;
b is an integer of from 1 to 10;
$R^3$ is a member of the group consisting of hydrogen, a $C_1$ to $C_{18}$ alkyl group, a $C_6$ to $C_{18}$ aryl group, a $C_5$ to $C_{18}$ cycloalkyl group, $-C(O)R^5$, $-C(O)NHR^6$, $-SO_3^-$, $-Si(CH_3)_3$, and $-P(O)(OCH_3)_2$;
$R^4$ is a member of the group consisting of hydrogen, a $C_1$ to $C_{18}$ alkyl group, a $C_6$ to $C_{18}$ aryl group,

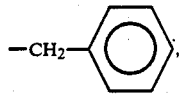

and a $C_5$ to $C_{18}$ cycloalkyl group;
$R^5$ is a member of the group consisting of a $C_1$ to $C_{18}$ alkyl group, a $C_6$ to $C_{18}$ aryl group, and a $C_5$ to $C_{18}$ cycloalkyl group;
$R^6$ is a member of the group consisting of a $C_1$ to $C_{18}$ alkyl group, a $C_6$ to $C_{18}$ aryl group, and a $C_5$ to $C_{18}$ cycloalkyl group; and
Z is a member selected from the group consisting of Cl, Br, I, $NO_3$, a $C_1$-$C_8$ alkylsulfate group, $-CH_3COO^-$, $BF_4^-$, and $PF_6^-$.

3. A method of reducing the surface tension of water, as claimed in claim 1, wherein said alkanolamino functional siloxane is added to water in the amount of 0.001 wt % to 5.0 wt %.

* * * * *